(12) United States Patent
Murphy et al.

(10) Patent No.: US 7,639,716 B2
(45) Date of Patent: Dec. 29, 2009

(54) SYSTEM AND METHOD FOR DETERMINING CLOCK SKEW IN A PACKET-BASED TELEPHONY SESSION

(75) Inventors: Liam Murphy, Dublin (IE); Hugh Melvin, Co Galway (IE)

(73) Assignees: University College Dublin, National University of Ireland, Dublin, Dublin (IE); National University of Ireland, Galway, Galway (IE)

( * ) Notice: Subject to any disclaimer, the term of this patent is extended or adjusted under 35 U.S.C. 154(b) by 374 days.

(21) Appl. No.: 10/562,790

(22) PCT Filed: Jun. 18, 2004

(86) PCT No.: PCT/EP2004/006808

§ 371 (c)(1),
(2), (4) Date: Dec. 29, 2005

(87) PCT Pub. No.: WO2005/006621

PCT Pub. Date: Jan. 20, 2005

(65) Prior Publication Data

US 2007/0116057 A1    May 24, 2007

(30) Foreign Application Priority Data

Jul. 4, 2003    (IE)    ................................ S2003/0505

(51) Int. Cl.
*H04J 3/06*    (2006.01)
(52) U.S. Cl. ........................ 370/509; 370/503; 370/507
(58) Field of Classification Search ................ 370/231, 370/235, 507, 512, 324, 503, 509
See application file for complete search history.

(56) References Cited

U.S. PATENT DOCUMENTS

| | | | | |
|---|---|---|---|---|
| 5,815,689 A * | 9/1998 | Shaw et al. | ................. | 713/400 |
| 6,327,274 B1 * | 12/2001 | Ravikanth | ................... | 370/516 |
| 6,643,496 B1 * | 11/2003 | Shimoyama et al. | .......... | 455/69 |
| 6,687,752 B1 * | 2/2004 | Falco et al. | ................. | 709/230 |
| 7,084,898 B1 * | 8/2006 | Firestone et al. | ......... | 348/14.09 |
| 7,088,398 B1 * | 8/2006 | Wolf et al. | ............... | 348/423.1 |
| 7,327,676 B2 * | 2/2008 | Teruhi et al. | ................ | 370/230 |
| 2002/0004841 A1 * | 1/2002 | Sawatari | ..................... | 709/232 |
| 2003/0072269 A1 * | 4/2003 | Teruhi et al. | ................ | 370/252 |
| 2003/0072310 A1 * | 4/2003 | Reme | ......................... | 370/394 |
| 2004/0066753 A1 * | 4/2004 | Grovenburg | ................ | 370/252 |
| 2004/0090994 A1 * | 5/2004 | Lockridge et al. | ........... | 370/509 |
| 2004/0252235 A1 * | 12/2004 | Ejima | ......................... | 348/515 |

* cited by examiner

*Primary Examiner*—Ricky Ngo
*Assistant Examiner*—Ben H Liu
(74) *Attorney, Agent, or Firm*—The Nath Law Group; Jerald L. Meyer; Jiaxiao Zhang

(57) ABSTRACT

A method for determining clock skew in a packet-based telephony session is disclosed. A telephony device receives RTCP SR packets from a remote telephony device transmitting RTP packets in a telephony session. Each control packet includes an NTP time-stamp and a RTP time-stamp. The device determines from two or more of the received SR packets a first relative rate of a remote media card clock to the remote system clock rate. Further, the device determines from two or more transmitted RTCP SR packets, a second relative rate of a local media card clock to the local system clock rate. The device can then be adjusted to take into account the first and second relative rates for optimum buffer management and to more accurately adjust the quality of a session based on one-way packet delay.

11 Claims, 3 Drawing Sheets

SYSTEM AND METHOD FOR DETERMINING CLOCK SKEW IN A PACKET-BASED TELEPHONY SESSION

CROSS-REFERENCE TO RELATED APPLICATIONS

This is a National Phase Application filed under 35 U.S.C. §371 of International Application No. PCT/EP2004;006808, filed on Jun. 18, 2004, which claims foreign priority benefit under 35 U.S.C. §119 to Irish Application No. S2003/0505, filed on Jul. 4,2003, the entire contents of each are hereby incorporated herein by reference in their entirety.

FIELD OF THE INVENTION

The present invention relates to a system and method for determining clock skew in a packet-based telephony session.

BACKGROUND OF THE INVENTION

Traditional telephony via the PSTN (Public Switched Telephone Network) reserves bandwidth in advance of a call and dedicates that bandwidth for the duration of the call. Additionally, it preserves the timing relationships in speech between sender and receiver through use of a common precise clock. This means that the speech is encoded at the sender exchange (with a 125 microsecond sample period), transmitted across the network and decoded at the receiver exchange with both encoding/decoding processes essentially synchronised because they share a common clock).

Packet-based telephony, in particular Voice over IP (VoIP), employing local area networks (LANs), wide area networks (WANs) or the Internet, on the other hand splits data into packets and transmits them independently of one another. However, transmitting multimedia data over packet-based networks introduces problems if the temporal relationship between adjacent packets at the sender cannot be maintained and reconstructed at the receiver. The trend towards Voice over IP (VoIP) in recent years has raised a range of complexities, in particular, resulting from the lack of a common clock.

These problems are described with reference to FIG. 1, where two Internet telephony devices 10-A and 10-B comprising, for example, a standard PC or IP phone run respective telephony applications 14. These can be voice-only applications or can be voice and video applications. (For video applications, the device will also include a video card (not shown).) During a session, each application 14 sends and receives packets of multi-media information across the Internet 12 and temporarily stores the received packets of information in an associated application buffer 16.

In the case of voice information, a codec 18 takes received packets from the buffer 16 and decodes the packet information to provide more binary like information for storing in a receive portion of buffer 26 in an audio card 20 located in or associated with the telephony device. The audio card 20 then replays the received information through for example, speaker(s) 30 or headphones connected to the audio card 20.

Sound received from a microphone or headset 32 is recorded by the audio card and is stored in a transmit portion of the buffer 26. This is encoded by the codec 18 and transmitted to the receiver.

The receive portions of one or both of the buffer 16 and 26 are employed to counter the effects of the potentially highly variable delay rate for packets, known as jitter, caused by the Internet's best-effort service. These buffers absorb jitter by accumulating incoming packets, helping to ensure that play-out is periodic and thus of good quality.

Each telephony device 10, typically contains a number of relatively low-grade oscillator crystals, among them the system clock crystal 24 to maintain system time, and an audio clock crystal 22, to set the sample periods for recording prior to encoding and for playback of decoded information. Such oscillator crystals can have inherent frequency errors greater than a few hundred parts-per-million resulting in accumulated errors of tens of seconds per day. For the purposes of the present application, the term "clock skew" is defined as this difference in a crystal's actual oscillator frequency from its nominal frequency.

Although the rate at which voice is recorded for encoding by the sender and played out after decoding by the receiver is purely determined by the audio card clock, the system clock is also used if for example packet-delay measurements are required, which is often the case. As such, there are often four separate clocks contributing to the session, each with its unique skew as illustrated in FIG. 2.

The NTP protocol (Network Time Protocol) employs numerous primary and secondary servers available through the Internet that are synchronized to Coordinated Universal Time (UTC) via radio, satellite or modem. This protocol enables the synchronisation of system clocks 24 across the Internet. Alternatively, as disclosed in U.S. Pat. No. 6,360,271, GPS clocks can be used to synchronise system clocks. The effect of synchronizing the system clocks 24 is to eliminate the effects of the deviation of the respective system clocks from their nominal frequency, i.e. system clock skew.

Still, a number of skew-related problems can arise:

Firstly, and with reference to packets being transmitted from device 10-A to 10-B. If the sender audio clock 22-A operates faster than receiver audio clock 22-B, this will lead to packet accumulation in one or other of the receive portions of the buffers 16-B, 26-B. This results in higher buffer residency delays and possibly buffer overflow (packet loss). If the sender audio clock 22-A operates at slower than clock 22-B, it will result in underfill of one or both of buffers 16-B, 26-B. Of course, the same applies for audio clock 22-B and the buffer 16-A, 26-A. Thus, if the receiver audio clock rate differs from the sender audio clock rate, then the receiver buffer(s) will either gradually fill or empty.

Secondly, in order to absorb the effects of network jitter, many VoIP applications utilise adaptive buffering approaches. These applications need to estimate changes in one-way delays and react accordingly. Other approaches use synchronised time for precise per-packet delay measurement, see for example H. Melvin and L. Murphy, "An evaluation of the use of synchronised time within a hybrid fixed-adaptive playout VoIP application ", Proceedings of IEEE Intl. Conference on Communications 2003, Anchorage, Ak., May, 2003 (Melvin et al). However, as outlined above, the rate at which packets are sent by the sender is solely determined by the sender audio card clock 22 (and not the sender system clock 24).

Again, with reference to packets being transmitted from device 10-A to 10-B, if the sender audio clock rate 22-A (which determines the rate at which packets are sent) is different from the receiver system clock 24-B (which timestamps packet arrivals to estimate delays), this will manifest itself in an apparent gradual increase or decrease in one-way delay. Thus skew between the sender audio card 22-A and receiver system clock 24-B will distort such measurements and thus the play-out mechanism and ultimately sound quality.

A number of approaches to resolving audio card clock skew between sender and receiver in a VoIP session have been proposed. O. Hodson, C. Perkins, and V. Hardman, "Skew Detection and Compensation for Internet Audio Applications", Proceedings of the IEEE Int'l Conference on Multimedia and Expo., New York, July 2000; and R. Akester, and S. Hailes, "A New Audio Skew Detection and Correction Algorithm", Proceedings of the IEEE Int'l Conference on Multimedia and Expo., Lausanne, August 2002 both disclose utilising a low level mechanism that measures audio skew by monitoring the data flow through the receiver-device i.e. audio card buffers 26-A, 26-B and thus involve low level programming and manipulation of audio card drivers.

Because, these approaches require low-level knowledge and manipulation of audio card hardware/software, although the concepts are universally applicable, implementation details will thus be product-specific. Additionally the mechanism used to measure audio skew is subject to 'noise' from network jitter and thus can return wrong results and thus respond inappropriately unless such noise is filtered out. Such filtering is a non-trivial problem.

According to the present invention there is provided a method for determining clock skew in a packet-based session. A sequence of control packets is received from a remote device transmitting media packets in a session, with each control packet including a remote real time-stamp and a remote media card clock time-stamp corresponding to the remote real time-stamp. A determination is made from two or more of said received control packets a first relative rate of a remote media card clock to the remote real time rate.

BRIEF SUMMARY OF THE INVENTION

The present invention can be implemented at a higher level than disclosed in the prior art and can utilise existing Internet protocols. In the preferred embodiment, audio skew is measured through a combination of RTP (Realtime Transport Protocol) Control Protocol (RTCP) Sender Report (SR) packets and use of NTP (Network Time Protocol) and is thus unaffected by network jitter. As such the mechanism will operate regardless of the underlying hardware/software.

Additionally, the preferred embodiment facilitates the effective implementation of synchronised time, by determining skew between a sender audio clock and a receiver system clock which will degrade the benefits of synchronised time, and this can in turn lead to more effective playout strategies.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT

Figure 1:
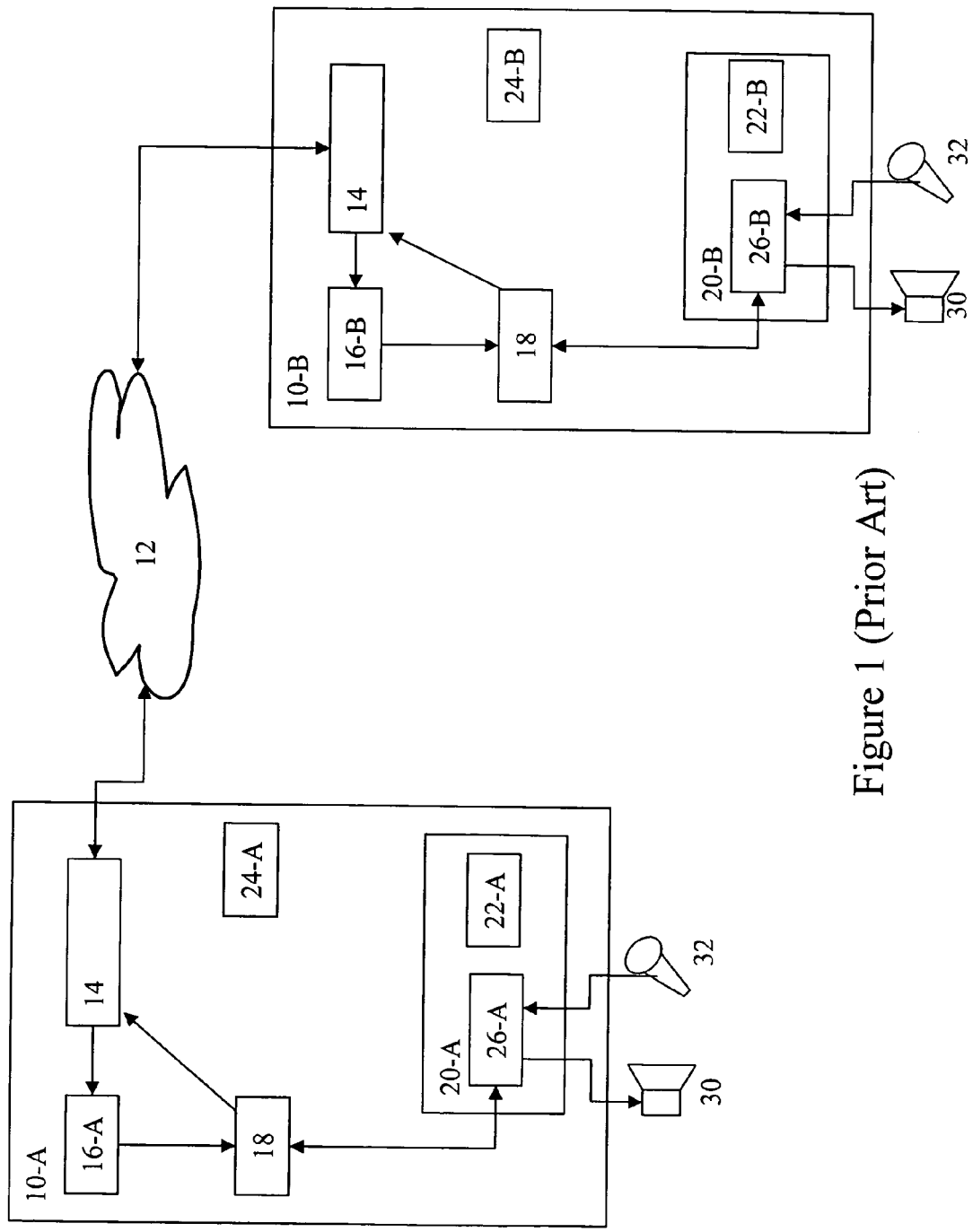
FIG. 1 is a schematic diagram illustrating the components involved in a packed-based telephony session.

The preferred embodiment of the present invention is implemented in packed-based telephony applications of the type shown in FIG. 1. The preferred embodiment uses existing Internet protocols already employed by the applications 14 to mitigate the effects outlined above of clock skew.

Figure 3:
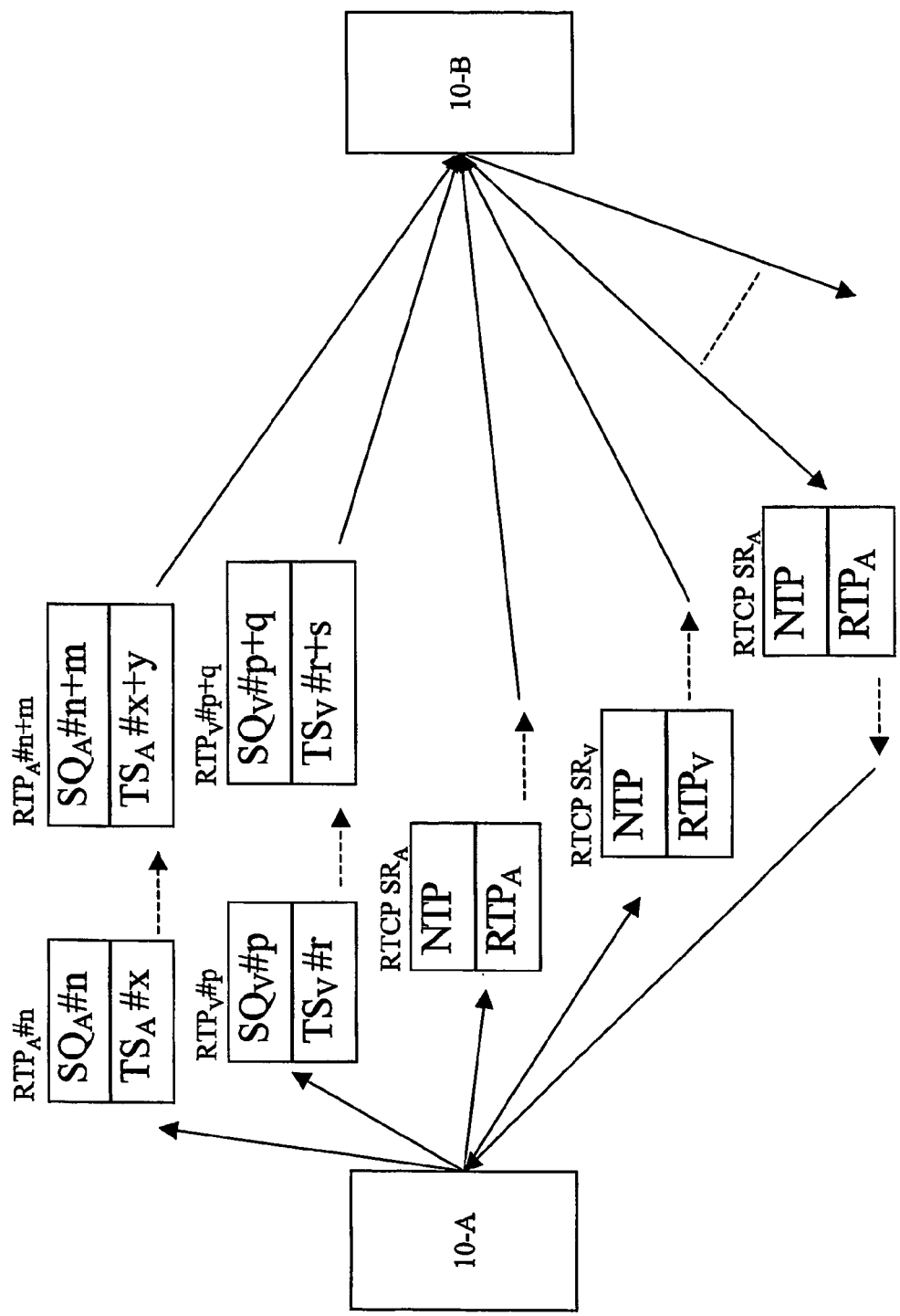
FIG. 3 illustrates the information included in RTP and RTCP protocol packets for transmitting information between the devices of FIG. 1.

Referring now to FIG. 3, which shows the header information for various packets transmitted by the multi-media telephony applications 14. RTP is an example of an Internet protocol used by such applications to deliver multimedia data. See H. Schulzrinne, S. Casner, R. Frederick, and V. Jacobson "RTP: A Transport Protocol for Realtime Applications," Internet Engineering Task Force RFC 1889, January 1996 for further information on RTP and the companion protocol RTCP.

For the purposes of the present application, each RTP packet includes an RTP header which in turn includes a sequence number (SQ) which is incremented for each RTP packet sent and a timestamp (TS) indicating the sampling instant of the first octet in the RTP data packet. These enable a receiver to accurately reconstruct media packets for playout. The timestamps are media specific and, in the case of voice data packets, the timestamps $TS_A$ include the sample number generated by the codec incremented at a rate determined by the audio card clock.

Thus, in FIG. 3, the device 10-A transmits a sequence of audio packets in RTP format. Audio packet $RTP_A$ #n will have a sequence number ($SQ_A$#n) corresponding to n, and the time-stamp of the audio clock ($TS_A$#x) at the instant the packet was created. The audio packet $RTP_A$#n+m will have an audio clock time stamp a given number of audio clock samples y after the time stamp for audio packet $RTP_A$ #n.

In a multi-media telephony application (eg videoconferencing with audio/video), at the same time, the codec 18 encodes RTP packets for information received from the video card. The sequence of video packets and their respective time-stamps are independent of those for the audio packets as they are based on video card clock samples.

As mentioned above, RTCP is a companion control protocol for RTP. RTCP SR packets are generated periodically for each media stream received by devices that are also senders. Thus, in multi-media telephony applications, during the lifetime of a media session, each sender periodically generates both audio (A) and video (V) RTCP SR packets and sends them to each receiving device. For the purposes of the present application, RTCP SR packets can be thought of as including two timestamps that are used especially in multimedia telephony to enable a receiver to sychronize audio and video packets and provide lip-synch. The timestamps are the system clock timestamp (in NTP format) indicating when the SR packet was generated, along with the corresponding RTP timestamp which is in the same format at the time-stamps TS in the RTP packets and thus determined by the audio or video card clock. This enables a receiver to match received audio packets with received video packets produced at the same time by a sender.

The preferred embodiment employs RTCP SR audio packets even when there is no video stream with which to synchronise the audio packets. The preferred embodiment is based on the realisation that if both system and audio card clocks are running at the same deviation from nominal on a given device, the time increment derived from respective RTP and NTP timestamps in successive RTCP SR audio packets will be equal. For example, if the interval between RTCP SR packets is 10 seconds according to the NTP timestamps, and if the audio clock card sample interval is 125 microseconds, the RTP timestamp increment should be 80000.

Figure 2:
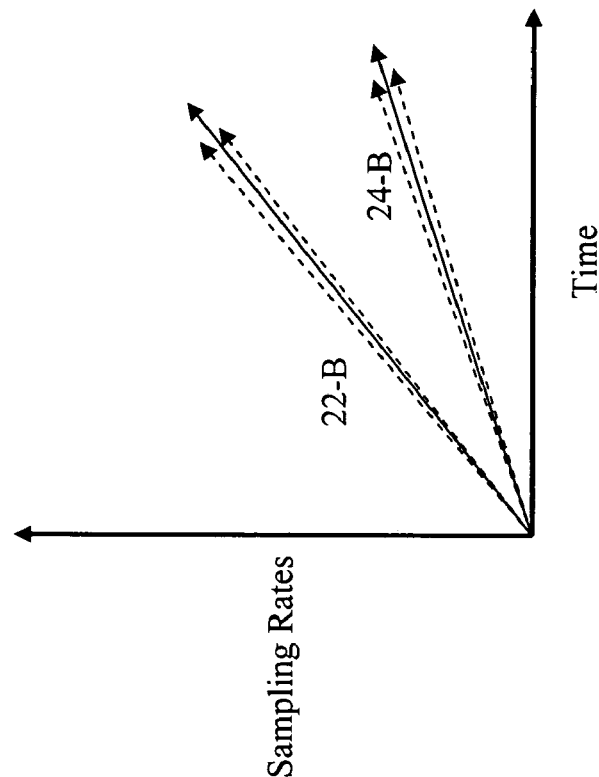
FIG. 2 illustrates the effect on sampling of clock skew for the audio and system clocks of FIG. 1.
Figure 2:
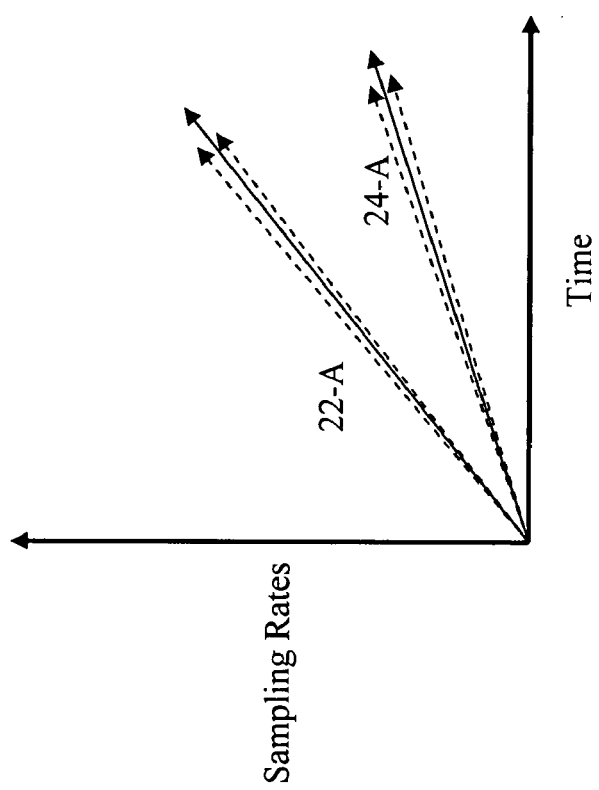

However, any difference in the interval defined by the successive RTP and NTP time-stamps indicates to the sender (and receiver) of the RTCP SR packets, the skew between audio card and system clock rates within the sending machine. So for example, if the audio card clock rate of the device 10-A is running faster than system clock 24-A, the time-stamp numbers for the $RTP_A$ components of RTCP SR packets sent 10 seconds apart (according to its system clock 24-A) will run in excess of 80000. Referring to FIG. 2, this enables the device 10-A to determine the relative relationship between the lines 22-A and 24-A (corresponding to the clocks 22-A and 24-A); and the device 10-B to determine the relative relationship between the lines/clocks 22-B and 24-B.

At the same time, each receiver can accumulate timestamp information contained within successive RTCP SR packets from the sender. This is conventionally used to enable the sender to calculate the round trip time, and also provides feedback to the sender relating to the quality of the session as seen by the receiver. However, in the preferred embodiments, any deviation of the audio clock card sampling rate from the system clock rate indicated by the NTP time stamps, enables each receiver to precisely and quickly determine the skew value between a sender's system and audio card clocks. Referring to FIG. 2, this enables the device 10-A to determine the relative relationship between the lines/clocks 22-B and 24-B and the device 10-B to determine the relative relationship between the lines/clocks 22-A and 24-A.

In the preferred embodiment, system clocks are synchronised, for example, via the Internet protocol NTP or any other suitable mechanism. Melvin et al show that NTP will provide millisecond-level synch on Local Area Networks and well provisioned Wide Area Networks. If not explicitly synchronised, then the implementation is based on the assumption that the clocks 24-A and 24-B of FIG. 1 are relatively synchronous and that the implementation is used to mitigate the effects of audio clock card skew, where the degree of audio clock card skew is assumed to be worse than system clock card skew.

In any case, knowing or assuming that the system clocks are synchronised, and knowing the relationship between the lines 22-A, 24-A (or for 10-A the relationship between lines 22-B, 24-B), each receiver can determine the skew between a sender audio clock and the receiver system clock, i.e. for 10-B the relationship between the clocks/lines 22-A and 24-B; and for 10-A, that between 22-B and 24-A respectively.

This combination of RTCP and NTP enables each receiver to determine precisely what compensating factor needs to be applied to incoming packets to avoid the gradual distortion of one-way delay that otherwise will corrupt the performance of adaptive playout algorithms and playout strategies based on synchronised time.

Furthermore, by examining its own RTCP SR packets being generated for transmission, the receiver can determine the skew between its own audio and system clocks. From an analysis of successive RTCP packets (incoming and generated), each receiver can therefore generate a precise picture of all four clock rates and implement appropriate compensatory action.

Thus, the preferred embodiment solves two problems: it detects audio-audio clock skew which can cause buffer under/overfill and also detects delay measurement skew, enabling playout quality to be optimised, for example, by implementing the hybrid playout algorithm as described by Melvin et al.

It will be seen that for audio-audio skew, once the skew value is determined, some mechanism is required to compensate for such skew. Hodson et al outline a solution that inserts/deletes appropriate samples within the receive portion of the audio card buffer 26 to compensate for such skew whereas Akester at al attempt to match the receiver audio clock rate to that of the sender. Alternatively, the application 14 could delete or pad entire packets within the receive portion of the buffer 16, again ensuring that the invention can be completely implemented at an application level.

It will be seen that while the preferred embodiment has been described in terms of specific Internet protocols, the invention is not so limited and is applicable where a determination can be made by a device from packets received from another device of the audio card skew of the other device.

In this regard, it will be seen that while the embodiment has been described in terms of RTCP control packets carrying the control information required to implement the invention for RTP media packets, the invention could be implemented where the media packets also contain the required control information. Thus, media packets may in fact contain control information or indeed control packets could contain media information.

The invention claimed is:

1. A method operable in a local device for determining clock skew in a packet-based session between said local device and a remote device with a non-deterministic packet delay, said method comprising the steps of:

receiving a sequence of control packets from the remote device transmitting media packets in a session, each control packet including a remote real time-stamp comprising a system clock time of the remote device and a separate remote media card clock time-stamp comprising a media card clock time of the remote device corresponding to the remote real time-stamp;

comparing a first real-time stamp and a first remote media card clock time-stamp from a first received control packet with a second real-time stamp and a second remote media card clock time-stamp from a second received control packet, respectively, to determine from said two received control packets, a first relative rate of a remote media card clock to the remote real time system clock;

transmitting a sequence of control packets from said local device transmitting media packets in said session, each control packet including a local real time-stamp comprising a system clock time of the local device and a separate local media card clock time-stamp comprising a media card clock time of the local device corresponding to the local real time-stamp; and comparing a third real-time stamp and a first local media card clock time-stamp from a first transmitted control packet with a fourth real-time stamp and a second local media card clock time-stamp from a second transmitted control packet, respectively, to determine from said two transmitted control packets, a second relative rate of a local media card clock to the local real-time system clock.

2. The method according to claim 1 comprising the step of: synchronizing said local real time rate with said remote real time-rate.

3. The method according to claim 2 wherein said devices communicate across an Internet Protocol (IP) network.

4. The method according to claim 3 wherein said network is one of a LAN (Local Area Network) a WAN (Wide Area Network) or the Internet.

5. The method according to claim 3 wherein Network Time Protocol is employed for synchronizing.

6. The method according to claim 1 wherein said media packets are Realtime Transport Protocol (RTP) packets and wherein said control packets are RTP Control Protocol (RTCP) Sender Report (SR) packets.

7. The method according to claim 1 further comprising the step of:

adjusting the contents of a buffer storing said media packets received from a transmitting device according to said first and second relative rates.

8. The method according to claim 2 further comprising the step of:
determining from a difference in time between local real time when a control packet is received and the remote real time-stamp of said control packet, a first approximation of one-way media packet delay; and
determining from said first relative rate and said first approximation a skew-corrected one-way media packet delay between devices in said session.

9. The method according to claim 8 further comprising the step of:
adjusting a playout strategy of said session according to said skew-corrected one-way media packet delay.

10. A device arranged to determine clock skew in a packet-based session with a non-deterministic packet delay between said device and a remote device, said device being arranged to:
receive a sequence of control packets from the remote device transmitting media packets in a session, each control packet including a remote real time-stamp comprising a system clock time of the remote device and a separate remote media card clock time-stamp comprising a media card clock time of the remote device corresponding to the remote real time-stamp;
compare a first real-time stamp and a first remote media card clock time-stamp from a first received control packet with a second real-time stamp and a second remote media card clock time-stamp from a second received control packet, respectively, to determine from said two received control packets, a first relative rate of a remote media card clock to the remote real time system clock;
transmit a sequence of control packets from said local device transmitting media packets in said session, each control packet including a local real time-stamp comprising a system clock time of the local device and a separate local media card clock time-stamp comprising a media card clock time of the local device corresponding to the local real time-stamp; and
compare a third real-time stamp and a first local media card clock time-stamp from a first transmitted control packet with a fourth real-time stamp and a second local media card clock time-stamp from a second transmitted control packet, respectively, to determine from said two transmitted control packets, a second relative rate of a local media card clock to the local real-time system clock.

11. A computer program product comprising computer program code stored on a storage medium which when executed in a local device is arranged to determine clock skew in a packet-based session with a non-deterministic packet delay between said local device and a remote device, said method comprising the steps of:
receiving a sequence of control packets from the remote device transmitting media packets in a session, each control packet including a remote real time-stamp comprising a system clock time of the remote device, and a separate remote media card clock time-stamp comprising a media card clock time of the remote device corresponding to the remote real time-stamp;
comparing a first real-time stamp and a first remote media card clock time-stamp from a first received control packet with a second real-time stamp and a second remote media card clock time-stamp from a second received control packet, respectively, to determine from said two received control packets, a first relative rate of a remote media card clock to the remote real time system clock;
transmitting a sequence of control packets from said local device transmitting media packets in said session, each control packet including a local real time-stamp comprising a system clock time of the local device and a separate local media card clock time-stamp comprising a media card clock time of the remote device corresponding to the local real time-stamp; and
comparing a third real-time stamp and a first local media card clock time-stamp from a first transmitted control packet with a fourth real-time stamp and a second local media card clock time-stamp from a second transmitted control packet, respectively, to determine from said two transmitted control packets, a second relative rate of a local media card clock to the local real-time system clock.

* * * * *

UNITED STATES PATENT AND TRADEMARK OFFICE
CERTIFICATE OF CORRECTION

PATENT NO. : 7,639,716 B2 Page 1 of 1
APPLICATION NO. : 10/562790
DATED : December 29, 2009
INVENTOR(S) : Liam Murphy et al.

It is certified that error appears in the above-identified patent and that said Letters Patent is hereby corrected as shown below:

Column 8, Claim 11, Line 15
Please delete "device, and"
and replace with -- device and --

Signed and Sealed this

Second Day of March, 2010

David J. Kappos
*Director of the United States Patent and Trademark Office*